US011350283B2

(12) United States Patent
Hassan et al.

(10) Patent No.: US 11,350,283 B2
(45) Date of Patent: May 31, 2022

(54) VERIFICATION OF CALLER LOCATION FOR USE IN ASSIGNING LOCATION-BASED NUMBERS

(71) Applicant: Microsoft Technology Licensing, LLC, Redmond, WA (US)

(72) Inventors: Amer Aref Hassan, Kirkland, WA (US); Hooman Shiranimehr, Sammamish, WA (US); Ashley Ingram, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 16/373,341

(22) Filed: Apr. 2, 2019

(65) Prior Publication Data

US 2020/0322791 A1 Oct. 8, 2020

(51) Int. Cl.
*H04W 12/00* (2021.01)
*H04W 12/37* (2021.01)
(Continued)

(52) U.S. Cl.
CPC ........... *H04W 12/37* (2021.01); *H04W 4/021* (2013.01); *H04W 12/033* (2021.01);
(Continued)

(58) Field of Classification Search
CPC ......... H04W 12/0027; H04W 12/0013; H04W 12/0609; H04W 12/00503;
(Continued)

(56) References Cited

U.S. PATENT DOCUMENTS 8,442,482 B2    5/2013  Maier et al.
8,504,614 B2    8/2013  Hubner
(Continued)

FOREIGN PATENT DOCUMENTS

WO    03030474 A2    4/2003

OTHER PUBLICATIONS

"International Search Report and Written Opinion issued in PCT Application No. PCT/US2020/024115", dated Jul. 10, 2020, 13 Pages.
(Continued)

*Primary Examiner* — Amare F Tabor
(74) *Attorney, Agent, or Firm* — Schwegman Lundberg & Woessner, P.A.

(57) ABSTRACT

Techniques and systems are disclosed to enable location verification and tracking, for use or access of a geographic-specific phone number or similar location feature of a communications service by a mobile computing device at (or within) a geographic location or defined area. In an example, verification of a use of the device at the location or area is enabled by the receipt and collection of location verification data for a token having location verification and time data, with such location verification data being communicated via a short-range wireless network. The verification is enabled by communication of the token to a communications service for device identification and location registration, and assess to a resource based on registered use of the communications device at the geographic location. In further examples, capabilities for security, verification, and auditing of location information is enabled with use of the token and location information.

16 Claims, 7 Drawing Sheets

(51) Int. Cl.
*H04W 4/021* (2018.01)
*H04W 64/00* (2009.01)
*H04W 12/033* (2021.01)
*H04W 12/63* (2021.01)
*H04W 12/06* (2021.01)
*H04W 12/069* (2021.01)

(52) U.S. Cl.
CPC ....... *H04W 12/068* (2021.01); *H04W 12/069* (2021.01); *H04W 12/63* (2021.01); *H04W 64/003* (2013.01)

(58) Field of Classification Search
CPC ........... H04W 12/0608; H04W 12/068; H04W 12/37; H04W 12/63; H04W 12/69; H04W 4/021; H04W 64/003; H04L 63/0807; H04L 63/123
USPC .......................................................... 726/1
See application file for complete search history.

(56) References Cited

U.S. PATENT DOCUMENTS

| | | | |
|---|---|---|---|
| 8,675,642 B2 | 3/2014 | Rosenberg et al. | |
| 8,918,639 B2* | 12/2014 | Phatak | H04L 63/0823 |
| | | | 713/156 |
| 9,077,566 B2 | 7/2015 | Campion et al. | |
| 9,078,093 B2* | 7/2015 | Kwak | H04W 4/026 |
| 9,191,386 B1* | 11/2015 | Yaron | H04L 63/0846 |
| 9,344,993 B2 | 5/2016 | Pitt et al. | |
| 9,515,836 B2* | 12/2016 | Tredoux | H04L 9/3234 |
| 9,549,319 B1 | 1/2017 | Butler et al. | |
| 9,578,505 B2* | 2/2017 | Buhler | H04W 12/06 |
| 9,640,002 B1* | 5/2017 | Grasberg | G07C 9/00571 |
| 10,165,495 B1 | 12/2018 | Hassan et al. | |
| 10,318,957 B2* | 6/2019 | Phillips | G06Q 20/3274 |
| 10,319,160 B2* | 6/2019 | Manikantan Shila | |
| | | | H04L 63/0838 |
| 10,332,110 B2* | 6/2019 | Patel | H04L 63/0853 |
| 10,360,363 B1* | 7/2019 | Grasberg | G06F 21/34 |
| 10,374,809 B1* | 8/2019 | Dasarakothapalli | |
| | | | H04L 9/3268 |
| 10,552,594 B2* | 2/2020 | Phillips | G06F 21/32 |
| 10,691,820 B1* | 6/2020 | Blum | H04L 67/1085 |
| 2010/0205316 A1 | 8/2010 | Xue et al. | |
| 2017/0171754 A1 | 6/2017 | South et al. | |
| 2018/0124561 A1 | 5/2018 | Hassan et al. | |

OTHER PUBLICATIONS

Arai, et al., "Emergency Call Requirements for IP Telephony Services in Japan", Retrieved From: https://tools.ietf.org/html/draft-arai-ecrit-japan-req-01, May 13, 2005, 24 Pages.

"Assign, Change, or Remove a Phone Number for a User", Retrieved From: https://docs.microsoft.com/en-us/skypeforbusiness/what-are-calling-plans-in-office-365/assign-change-or-remove-a-phone-number-for-a-user, Oct. 4, 2018, 4 Pages.

"What are Emergency Locations, Addresses, And Call Routing?", Retrieved From: https://docs.microsoft.com/en-us/microsoftteams/what-are-emergency-locations-addresses-and-call-routing, Nov. 27, 2018, 3 pages.

Wu, et al., "Location-Based Services in Internet Telephony", In Proceedings of Second IEEE Consumer Communications and Networking Conference, Jan. 3, 2005, 6 Pages.

* cited by examiner

VERIFICATION OF CALLER LOCATION FOR USE IN ASSIGNING LOCATION-BASED NUMBERS

BACKGROUND

With the widespread deployment of wireless networks and portable computing devices, a computing user may operate their computing device at any number of locations. For instance, a user may choose to utilize a notebook computer, tablet, smartphone, or other mobile computing device at an airport, home, restaurant, remote worksite, or many other private or public locations.

The mobility of computing devices and the increased prevalence of wireless network connectivity has added complexity to a variety of real-world communication scenarios, especially scenarios involving location-dependent characteristics. As one example, a computing device may have robust wireless network connectivity throughout a large geographic area and have the potential to conduct a voice-over-IP (VoIP) call over the Internet at nearly any location in which wireless network connectivity can be established.

Some types of location features and services, such as the use of location-based phone numbers or identification codes, have restrictions to prevent their use outside of a defined area (such as a city, metropolitan area, province, country, etc.). Such restrictions may exist for a variety of technical or operational reasons, including to prevent fraudulent use, or to ensure that other communication services such as emergency calling can be fulfilled for users. As a result of these restrictions, regulatory requirements have been proposed or enacted in some jurisdictions to block certain communication services from being made widely accessible via Wi-Fi and wide-area wireless data networks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
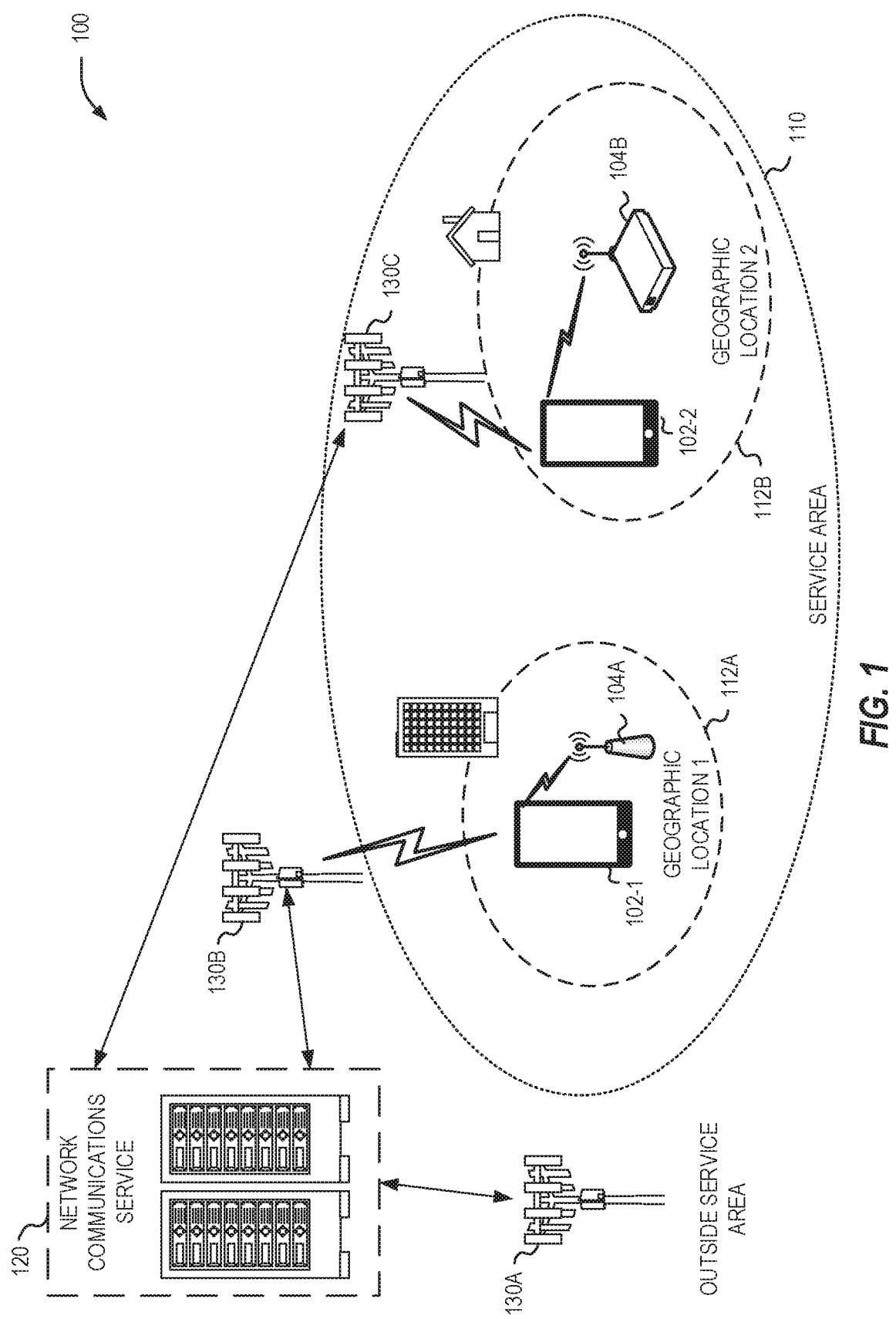
FIG. 1 depicts an example scenario of location-verified communication operations, according to various examples of the present disclosure.

Disclosed in some examples are methods, systems, devices, and associated operations and functionality that enable the use of communication applications and services that are dependent on the location of a user or user device, through location-dependent verification and tracking (further discussed herein with respect to "location-sensitive" or "location-restricted" applications and services). The location verification and tracking techniques discussed herein may be applicable to perform a variety of service verification and auditing capabilities, including but not limited to the use with location-sensitive or location-restricted Public Switched Telephone Network (PSTN) services and numbers that are associated with a geographic location.

In an example, network service and client scenarios are disclosed which involve the validation (e.g., prior to network connectivity or resource usage) or verification (e.g., after network connectivity or resource usage) of the location of a mobile device or mobile device service usage. For example, this may enable the validation or verification that a mobile device is using, has used, or is approved to use a particular phone number within a geographic area or zone. This validation or verification may also occur to assist the calculation of whether the mobile device is located within the geographic area or zone for at least a certain amount or measurement of time—such as to comply with requirements that a mobile device must be located within a geographic area n percent of time to continue to use a certain phone prefix or phone number.

The validation or verification techniques discussed herein may be performed through the communication and processing of a location-unique certificate, token, or identifier which includes information provided to a mobile device via a geographically-known verifier device. This verifier device, for instance, may be a beacon or access point which provides proof of the geographic location (e.g., a unique identifier known to a validation service) that cannot be replayed or spoofed (e.g., through the use of a randomly generated identifier, or through encrypted information). The network infrastructure service tracks and maintains the location-unique information in a log or other data store, to provide proof or to verify the location of the mobile device as in proximity to the verifier device.

In further examples, the location-unique token or identifier may be communicated from the verifier device to the mobile device on a short-range wireless network (e.g., a network with a typical radio communication range of under 100 meters), such as a Bluetooth or Bluetooth Low Energy (BLE) beacon, a Wi-Fi (e.g., a standard compliant with IEEE 802.11) access point, a near-field communication (NFC) tag, or like devices. The verifier device may be fixed or operating at a known mobile location. The proximity of the mobile computing device to this verifier device, being able to receive the location verification data within a short-range radio communication range, provides proof that the mobile computing device is at (or was at) the known geographic location. Further, the verifier device may provide a security feature or pass additional information to prevent spoofing or replay of the token or identifier.

Use of the present techniques may provide a number of improvements and efficiencies in network and processing operations for both client-based communication devices and server-based location-dependent communication services. First, the techniques introduce a new level of authentication and auditing for the issuance and use of geographic-specific phone numbers and similar network identifiers. Second, the techniques enable the communication and tracking of geographic location information, including in scenarios where a client cannot obtain information from conventional location services (e.g., when indoors and unable to access GPS, or when network equipment is unable to resolve a precise location). Third, the techniques improve compliance with applicable regulatory rules and constraints, to expand the number of use cases in which a device is allowed or enabled (not prohibited or restricted) to use a location-dependent service.

The present disclosure thus addresses issues with computer networking in which a client device location is not (or cannot be) fully tracked, or where location information might be potentially spoofed or provided via an untrusted source. The present techniques provide technical solutions and benefits that are applicable to client devices, location-based services, networking services and systems, and communication applications. The disclosed techniques improve the functioning of multiple network processing entities by enabling use of security, attestation, and resource management improvements for both network and client systems. These and other benefits will be apparent from the following examples and illustrations.

FIG. 1 illustrates an example scenario 100 of location-verified communication operations. Computing device 102, shown as a mobile smartphone, is a portable computing device capable of operating at different locations. Specifically, the scenario 100 shows the location of mobile device 102-1 at a first location, within an area defined as a first geographic location 112A, and the location of the mobile device 102-2 at a second location, within an area defined as a second geographic location 112B. For instance, the first geographic location 112A may be associated with a workplace of the user of the mobile device 102, and the second geographic location 112B may be associated with a home of the user of the mobile device 102.

As will be understood, the mobile device 102 may move among different locations of a corporate, personal, or other network deployment provided by various network access points or networks, such as mobile phone networks provided by carrier network stations 130A, 130B, 130C (e.g., network stations operating according to a 4G/5G wireless data network). In other examples, network access points which operate according to an Institute for Electrical and Electronics Engineers (IEEE) 802.11 (Wi-Fi) protocol can provide network connectivity. The network access that is obtained via the network stations is used to obtain access to a network communication service 120, which in the following examples provides a location-restricted service (e.g., usage of location-restricted phone numbers).

In an example, the network communication service 120 provides voice, video, or other communication functionality with other devices and users as part of a Voice-over-IP (VoIP) calling service. In a further example scenario, discussed in more detail in FIG. 2, the VoIP calling service implemented by the network communications service 120 includes functionality to perform calls with conventional telephone services, including the integration of phone number management with a location verification service (e.g., to assign or use geographically restricted telephone numbers).

Other devices or components may be used to relay or extend communications to other devices and device components. Thus, it will be understood that the techniques discussed herein are not limited to a particular form factor of the devices 102, 104A, 104B, or any peripheral or software client used with such devices. Likewise, the techniques discussed herein are not limited to phone or voice calls but may extend to a variety of types and forms of communications.

The computing device 102 may scan for information broadcast by a verifier device, such as device 104A located within the first geographic location 112A, or device 104B located within the second geographic location 112B. For instance, the verifier device 104A may be a beacon (e.g., Bluetooth, Bluetooth Low Energy, or NFC beacon), and the verifier device 104B may be an access point (e.g., Wi-Fi access point operating according to an IEEE 802.11 family of standards) which transmits location verification data.

The network communications service 120 may store and track a plurality of locations of computing devices and verifier devices. The network communications service 120 may perform this tracking as part of a device-location registry, discussed further below. The association of a device with a location may be based on location information communicated by a respective verifier device, such as discussed in the examples below.

As an operational example, consider a scenario where the mobile device 102-1 connects to the wireless data network 130B while located in a first geographic location 112A (a workplace). When the mobile device 102-1 is in proximity to the beacon 104A, the mobile device 102-1 receives the location verification data, and communicates this information to the network communications service 120 (e.g., when a resource of the service is used, or at regular intervals). In response, the network communications service 120 validates the use of the resource within the geographic location. When the mobile device 102-2 moves to the wireless data network 130C, the device becomes in proximity to the access point 104B, and repeats the operations but with the new location verification data.

In a scenario where a location-sensitive service may be accessed at a different geographic location (e.g., at a workplace, at home etc.) the location information provided via the respective verifier device 104A, 104B may be used by the network communications service 120 to track amounts of usage at different locations. However, in scenarios where a location-restricted service includes restrictions to allow access within a larger service area 110 but to prevent access outside the service area, then the location information may be used to control access or usage of a resource or service. Thus, connectivity via the wireless data network 130A, when the mobile device 102 is not proximate (in radio range) to a verifier device within the service area, will not result in service access or resource availability. Other default or restriction behaviors may also occur based on the definition of a service area, geographic location, and capabilities of the network communications service 120.

As will be understood, location-verification techniques are not limited to cellular network connectivity, but may be useful in a number of wide area connectivity settings involving cellular base stations, repeaters, microcell stations, picocell stations, or home repeaters that are located in various geographic areas. Further, the techniques may be applicable for distributed network access (e.g., to the Internet) via many Wi-Fi access points.

Figure 2:
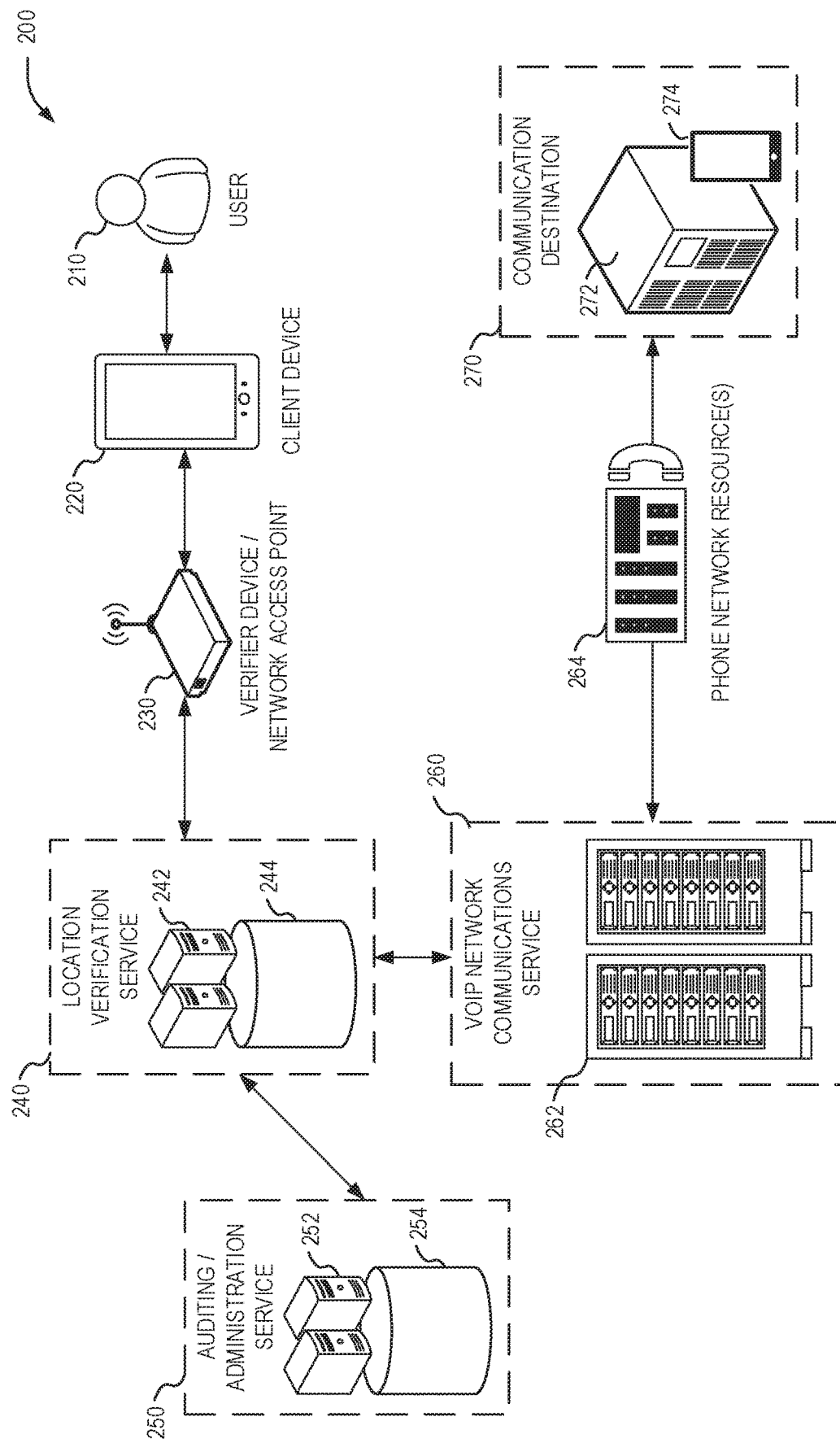
FIG. 2 depicts a sequence for obtaining and communicating information from a verifier device for location-verified communication operations, according to various examples of the present disclosure.

Turning now to FIG. 2, an example sequence 200 of obtaining and communicating information from a verifier device for location-verified communication operations is illustrated. The operations of the sequence 200 may be performed by aspects of a client device 220, a verifier device 230, or hardware implementing services 240, 250, 260 and functionality discussed herein.

The sequence 200 illustrates a user 210 operating a client device 220 for access to a location-restricted service, namely, a location-restricted phone network resource. The client device 220 receives location verification data from a network access point 230 also operating as a verifier device. This location verification data is placed into a token (or certificate or other data structure) which is communicated by the client device 220 to the location verification service 240, for access to resources usable via a VoIP network communications service 260.

In an example, the location verification service 240 includes a processing server 242 and a database 244 which respectively determines the location of the client device 220 and tracks the location of the client device 220 and other location- or security-relevant values. The token may include a header with device identification information, time information, security information (e.g., keys, signatures), or the like. The token may include information specific to use with a particular platform service or application, such as a phone dialer which invokes the token and obtains relevant identification information for use with dialing operations.

The validation or verification of the client device 220 location, via the location verification service 240, may be used to enable, continue, update, or modify the access to a resource or service offered via a VoIP network communications service 260. The VoIP network communications service 260 may include processing hardware 262 which allocates phone network resources 264 for use with a communication session (phone or videoconference call) with a communication destination 270. This communication destination 270 in turn may also have processing hardware 272 and a connected end device 274 (e.g., another use receiving the session or call). The validation or verification of the client device 220 location may also be coordinated with an auditing and administration service 250, which includes a processing server 252 and a database 254 for controlling tracking or auditing functions.

As an example, the techniques herein may be applicable to the location restrictions placed by use of 0AB-J numbers issued in Japan (e.g., telephone numbers that are used for fixed line phone services). The use of the techniques discussed herein may enable verification of numbers or number blocks that are restricted to use within a particular geographic or other service area. In some cases, future regulation may allow the use of geographic numbers (e.g., the 0AB-J numbers) a certain percentage of time based on requirements such as outbound calls needing to be performed from a particular area over n percent (e.g., 55%) of the time. The present techniques enable keeping an inventory of such events, and performing analysis for the purpose of policy or commercial outcomes.

Figure 3:
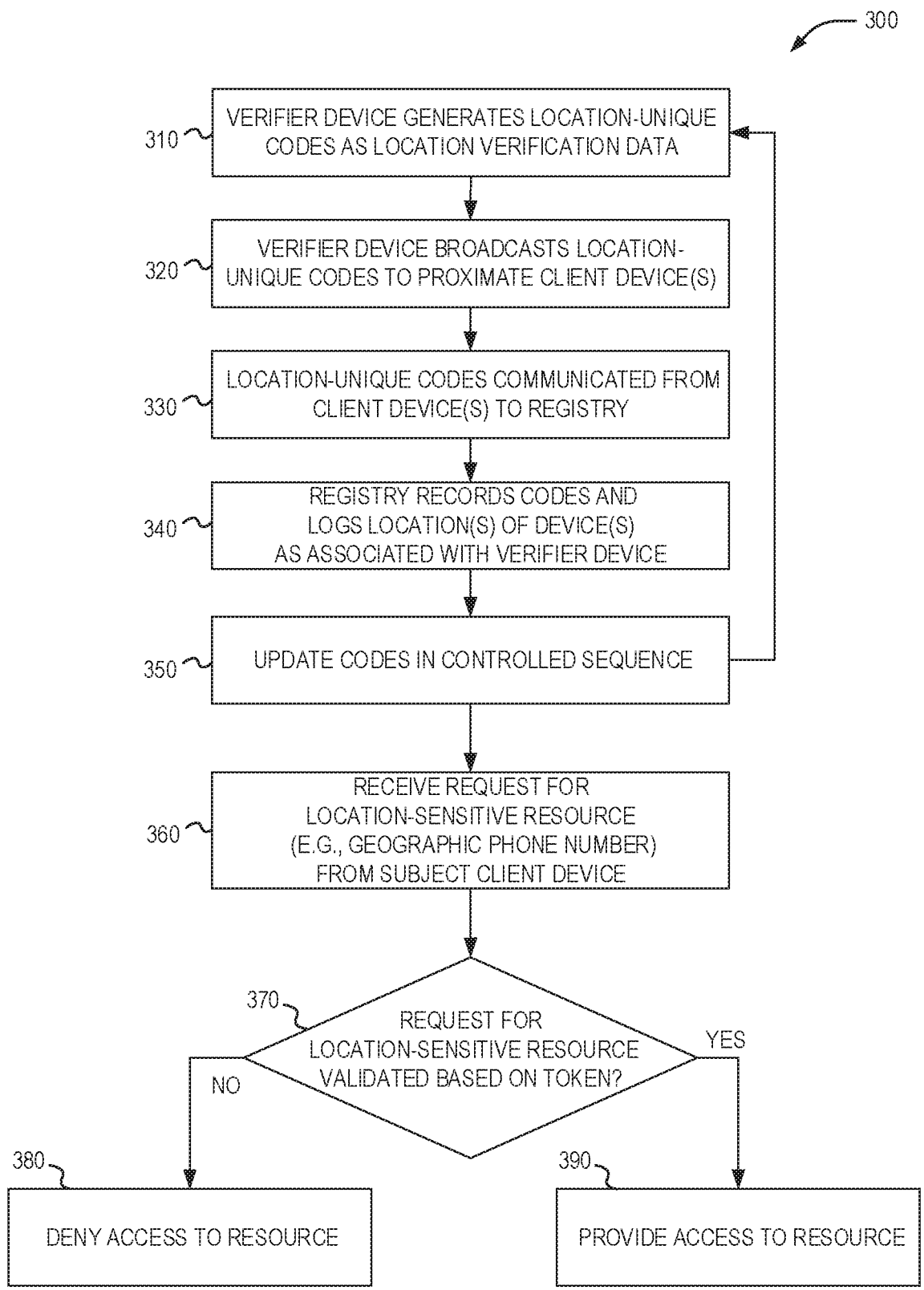
FIG. 3 depicts a flowchart of a method performed by a communications service and verifier device, for enabling location-verified service operations, according to various examples of the present disclosure.

FIG. 3 depicts a flowchart of a method performed by a communications service and verifier device for enabling location-verified service operations. As shown, the flowchart 300 of FIG. 3 commences with a verifier device generating location-unique codes as location verification data (operation 310), which is followed by the verifier device broadcasting the location-unique codes to the proximate client devices (operation 320), such as devices in geographic proximity (as limited by short-range radio capabilities). Other fields may also be communicated as (or to accompany) location verification data. In other examples, another source (e.g. the location verification service) generates and communicates location-unique codes or other location-identifying information. Also in other examples, a request-response model is used to communicate the information from the verifier device to nearby client devices instead of broadcasts.

The location-unique codes are communicated from client devices to a registry of the location verification service (operation 330) using network connectivity (e.g., via an Internet connection). Based on the receipt of this information, the location-unique codes or equivalent information to verify the location of the user at the geographic location is recorded with the location verification system (operation 340). For instance, this information may be logged in a database, and create an association between a client device, a verifier device (or information communicated by the verifier device), and a geographic location. At a subsequent time (e.g., based on a schedule, event, etc.) according to a controlled sequence, the location-unique codes are updated and communicated via the verifier device (operation 350, which may repeat operations 310-340).

In further examples, security techniques such as encryption may be used to prevent replay attacks. For instance, the verifier device may encrypt random codes along with a client device-unique identifier to each respective client device registered with the device. The client device then communicates this encrypted random code and the client device-unique identifier to the registry. The registry can decrypt the packet using a key associated with the verifier device.

The remainder of the flowchart 300 illustrates a scenario where the location verification information is used. This location verification may occur in response to a request for a location-sensitive or location-restricted resource (operation 360), such as for a request from a client device for use of a geographically restricted phone number. Based on this request, an evaluation of relevant codes or token may be performed, such as validation of a token (determination 370) to identify whether the request for the resource can be validated based on a token supplied by the mobile computing device. If this request can be validated, access to the resource (e.g., geographic-restricted phone number, or a call using the geographic-restricted phone number) may be granted (operation 390); if this request cannot be validated, then access to the resource may be denied (or, alternately, restricted, logged, or handled in another way).

Figure 4:
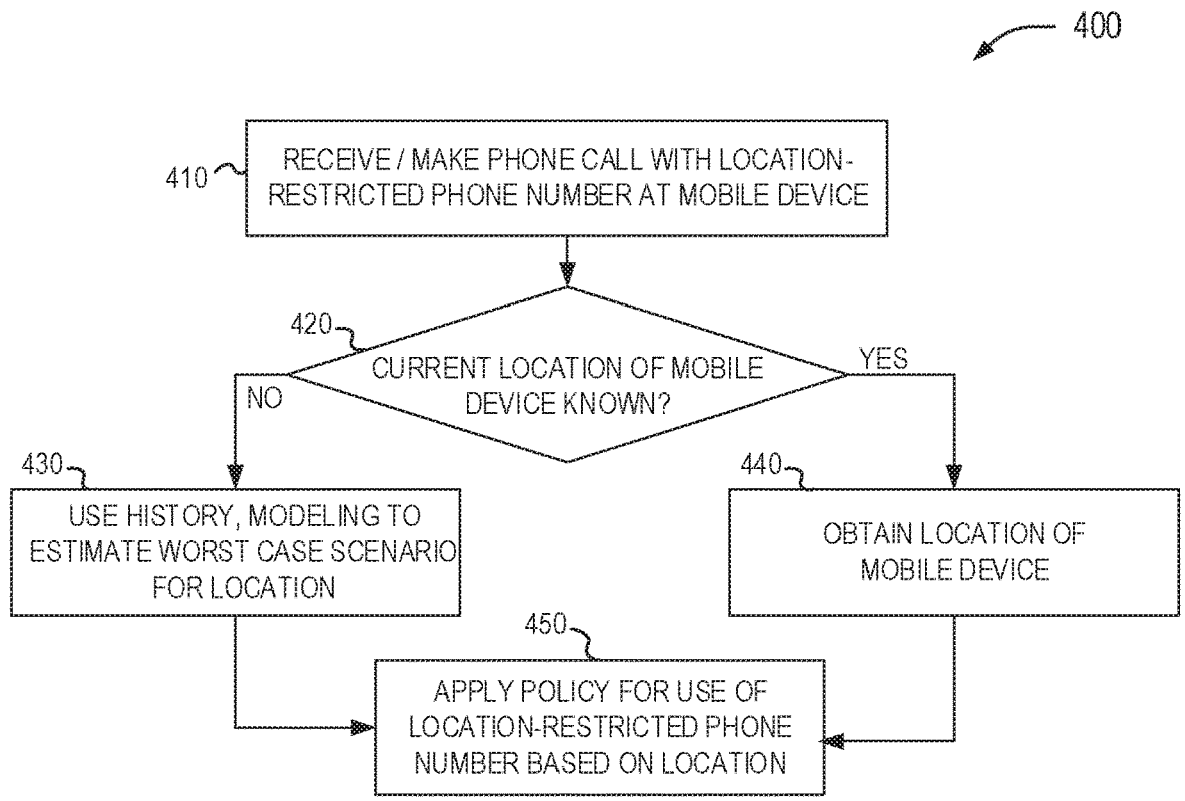
FIG. 4 depicts a flowchart of a method performed by a communications service for applying a policy for location-verified service operations, according to various examples of the present disclosure.

FIG. 4 provides a flowchart 400 of a method performed by a communications service for applying a policy for location-verified service operations. Specifically, this flowchart illustrates a scenario involving the connection of phone calls based on usage of a location-restricted phone number. Additional processing steps to perform verification or restrict usage may be enacted based on the current location status of the mobile device (e.g., the mobile device attempting to make or receive a phone call using a location-restricted phone number).

The flowchart 400 of FIG. 4 commences with operations involving receiving or making a phone call with a location-restricted phone number via a mobile device (operation 410). This processing is followed by an identification of whether the current location of the mobile device is known (determination 420). For instance, this determination may involve identifying the location of the device as communicated via the techniques discussed in FIGS. 1 to 3, above, or via other location tracking techniques.

If the current location of the mobile device is identifiable, the location of the mobile device is obtained and used by the location verification service (operation 440); if the current location of the mobile device is not known, is not accessible, or is not determinable, then history or modeling may be used to estimate a location (operation 430). For example, such modeling may use artificial intelligence and to estimate a worst case or predicted scenario for a location of the mobile device. For instance, a modeling technique may infer the location based on the last known location and phone sensor data indicating a distance traveled by user (e.g., a number of steps recorded by the phone). Also, for instance, a modeling technique may infer a location based on use of a ping by the mobile phone to a proximity access point, where the ping information is entered into a database with user information (e.g., tracked by MAC address) and location of the APs receiving the ping, The flowchart 400 concludes with operations to apply a policy for the use of the location-restricted phone number, based on the known or worst-case scenario location of the device (operation 450). This policy may result in different service capabilities or alternatives being offered by a communications service (e.g., blocking a call, offering use of another phone number, etc.).

In further examples, operations may be performed in connection with the location verification as part of billing or service function auditing, such as in scenarios where different charges are issued based on use of a resource or service at different locations. Also in further examples, operations may be performed in connection with the location verification as part of emergency call services, or other location-specific or location-based use cases.

Figure 5:
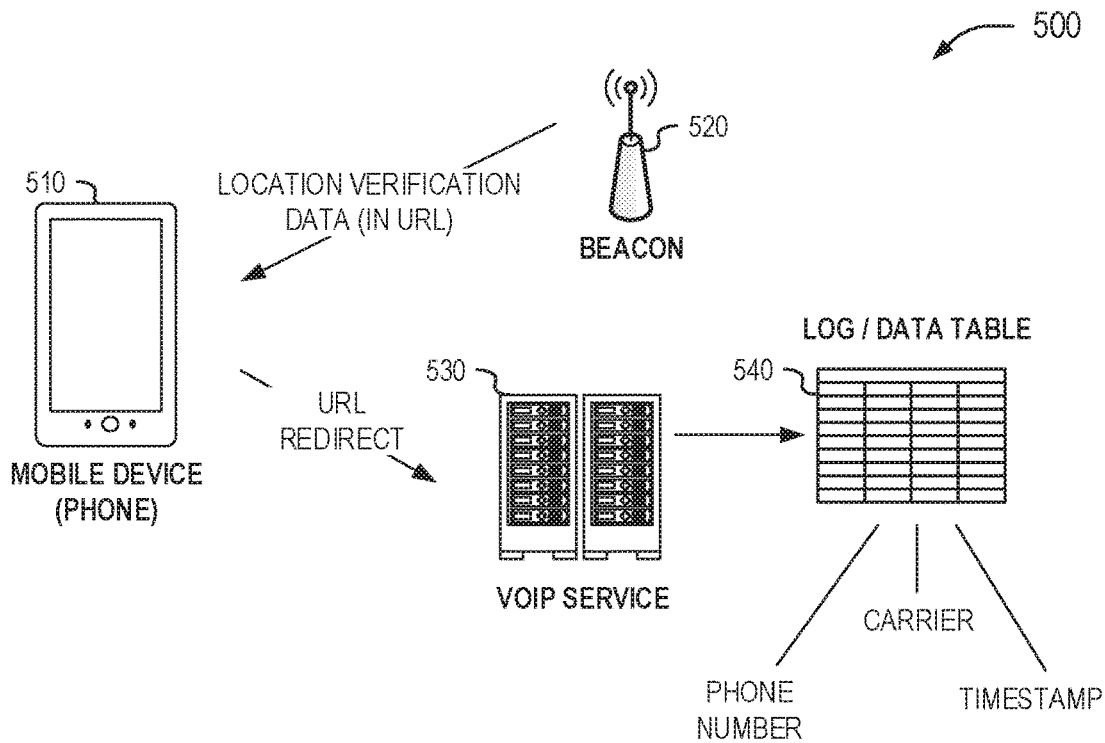
FIG. 5 depicts a sequence for accessing location-verified service operations using web-based access, according to various examples of the present disclosure.

FIG. 5 depicts an example sequence 500 for accessing location-verified service operations using web-based access, further to the examples of location verification discussed in the examples above. Specifically, the following web-based access provides a method of communicating a token, identifier, or other information from a verifier device, a beacon 520, to a mobile device 510, using location verification data included within a URL (e.g., a URL including a randomly generated identifier that is tied to a known location). This URL is then accessed by the mobile device 510, which redirects a software client (e.g., VoIP client) to a database recording the user, location, and/or service identity, to enable use of a VoIP service 530.

Based on access to the VoIP service 530 via the URL, the location verification data may be used to correlate and track a session, usage of a resource, a call, or the like to location characteristics, such as in a log or data table 540. For example, information such as a phone number, carrier, and time stamp may be associated with the location of the beacon 520. Similar data values may also be associated and tracked.

Figure 6:
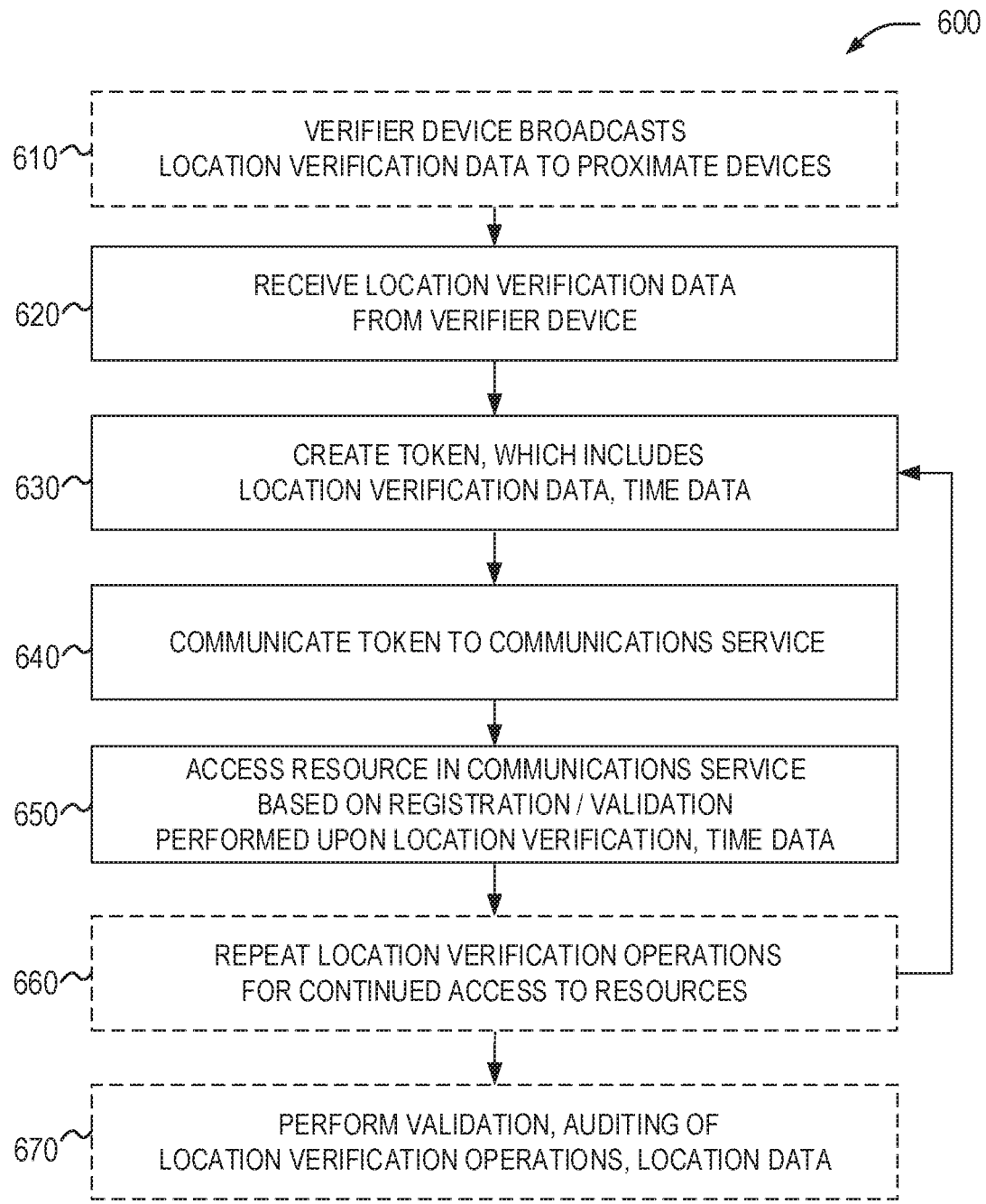
FIG. 6 depicts a flowchart of a method performed for enabling location-verified communication operations, according to various examples of the present disclosure.

FIG. 6 depicts a flowchart 600 of a method for enabling location-verified communication operations, including through implementation of the detailed algorithms and techniques discussed above. The flowchart 600 of FIG. 6 commences with an optional pre-condition of the verifier device broadcasting location verification data to devices in proximity (operation 610), such as devices in radio communication range to a subject client device. This location verification data may include the characteristics discussed above and be received via an implementation of a short-range radio network (such as a local area wireless network, or from a distance-limited beacon broadcast), in a scenario where a subject client device is in physical proximity (e.g., geographically co-located) to the verifier device (e.g., within 100 meters). In a further example, the location verification data provides an encrypted version of a random code; also in a further example, the broadcast or information data is time-limited, such as by changing at regular intervals, having an associated expiration, or using various mechanisms to become invalid after a period of time. In another example (not shown), the location verification data may be requested or queried by the client device instead of being broadcast.

The flowchart 600 continues with operations to receive the location verification data from the verifier device (operation 620), when the client device is located at a subject geographic location in proximity to the verifier device. In various examples, the location verification data is unique or identifiable to the subject geographic location and can be used to identify or confirm the presence of the client device at the subject geographic location. This subject geographic location may specify, correspond, encompass, or be associated with a location such as: a building, a floor of a building, an area of a city, or a group of locations, within wireless communication range of the verifier device. This subject geographic location may correspond to the area(s) at or around a geographic location 112A, 112B, or a portion of the service area 110 discussed in FIG. 1. In a further example, the location verification data may provide an encrypted version of a random code, with the random code being synchronized and verified by the communications service for use of a resource, as discussed herein.

The flowchart 600 continues with operations to create or populate a token, based on the received location verification data, time data, and other relevant identification information for a time-specific location of the client device (operation 630). For instance, the time data may be a timestamp generated by the client device which indicates use of the communications device at the geographic location at an indicated time. In some examples, the time data may be generated or provided by the verifier device (e.g., when the location verification data was generated or validated); in other examples, the location verification data is associated with a time value tracked by a third party, or a time-specific or time-limited identifier is provided from the verifier device, to enable the third party or another entity to determine when the location verification data was provided. Thus, in some examples, additional or less information of the token may be provided from the verifier device; in some examples, all of the token data may be communicated from the verifier device to the client device, and then communicated from the client device, as discussed in the following operations.

The flowchart 600 continues with operations to communicate (e.g., transmit, upload, indicate usage) the token from the client device to a communications service. In further examples, the token may include an identifier of the client device, such as for auditing, billing, or tracking purposes. The location verification data may be used by the communications service (or, a location verification service associated with the communications service) to initiate, establish, or validate a communication session between the communications service and the client device, based on verification of the token. For instance, use of a geographic-based communication feature of the communications service (such as a geographic-limited phone number) may be enabled based on verification of the token. In an example, the communication may be based on a packet or other data provided over a network; in a further example, the token or other identifying information may be communicated from the token in a URL accessed by the client device. In some examples, the location verification data is received from the verification data source via a first wireless radio protocol (e.g., Bluetooth, BLE, NFC, Wi-Fi), but the token is transmitted to the communications service via a second wireless radio protocol (e.g., via a 4G/5G mobile data network). In other examples, the same wireless radio protocol (e.g., Wi-Fi) is used for both receiving and transmitting, such as from a same access point configured to broadcast the location verification data and also to provide Internet access.

The flowchart 600 continues with access to a resource in the communication service (operation 650), based on the indication of the communications device at the geographic location, and any accompanying registration which is accomplished with the communications service. This resource may be part of a location-based service which provides information based on the verified location of the client device; this resource may be part of a location-independent service such as telephony which works regardless of the location of the client device.

The flowchart 600 concludes with optional operations to repeat one or more of the location verification options, to obtain continued access to resources (operation 660) and to enable the validation or auditing of location verification operations and communicated location data (operation 670). For instance, a subsequent token may be generated and communicated from the client device, which includes updated time data to allow tracking of the amount of time that the client device was known to be located proximate to the verifier device. Likewise, updated location verification data may be received by the client device from a subsequent verifier device broadcast and included in a new token that is generated and communicated to the communications service. The validation and auditing may occur in real time or at a later time. Accordingly, the techniques of flowchart 600 may be implemented for current or prospective connection settings (or, to enable or disable access to the resource).

In further examples, other techniques may be used to communicate, exchange, and propagate the location verification data discussed herein. For example, information may be communicated in a peer-to-peer or ad-hoc setting for linked or group client devices. For example, a common group of devices (e.g., trusted devices associated with a common user or entity) may exchange location verification data with each other, to reduce the number of communications needed with a verifier device and a communications service system.

Figure 7:
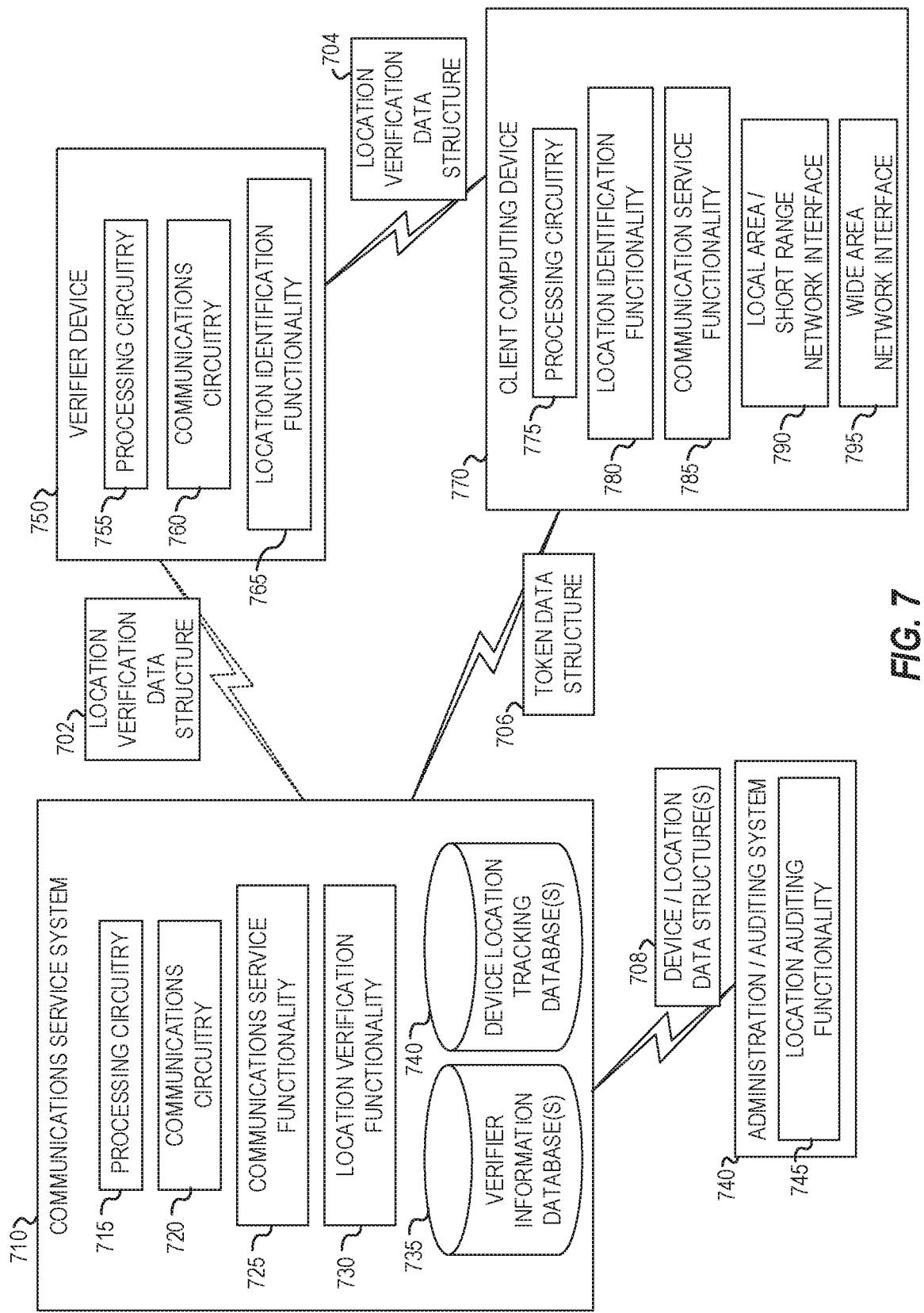
FIG. 7 illustrates a schematic of operational and functional components used among client and service systems within the present location verification framework, according to various examples of the present disclosure.

FIG. 7 illustrates a schematic of operational and functional components used among client and service platforms with the present location tracking techniques. These components include a communications service system 710, a verifier device 750, a client computing device 770, an administration/auditing system 740, and various sub-components that are included or associated with the location verification operations discussed herein. The communications service system 710 may be an example of a server that implements the location-sensitive services and allocates resources (e.g., VoIP, phone network, or data service resources) discussed herein for access by the client computing device 770. The client computing device 770 may be an example of a mobile computing device discussed herein. The verifier device 750 may be an example of a beacon or access point discussed herein. The administration/auditing system 740 may be an example of a server that implements the services for location auditing, to facilitate business or technical service operations discussed herein.

The components shown in FIG. 7 may be embodied or implemented in hardware, software, or any combination thereof. The functionality of each component is one example arrangement of functionality and one of ordinary skill with the benefit of the present disclosure will appreciate that other organizations are possible. Each of the illustrated systems 710, 750, 770 are depicted as including processing circuitry 715, 755, 775, such as a CPU and memory configured to execute respective software instructions. Further, one or more of the functions of one or more the communications service system 710 may be performed by distributed server-side components within the overall system. Likewise, one or more of the functions of one or more components of the client computing device 770 may be performed by one or more of the other client-side components.

The client computing device 770 is depicted as including location identification functionality 780 adapted to receive and forward the location verification data, using the techniques discussed above, and communication service functionality 785 to access and use a location-dependent (e.g., location-restricted, location-sensitive) resource or service, as discussed herein. The client computing device 770 may additionally include other communications interface capabilities such as VoIP software or hardware (e.g., audio processing hardware, videoconferencing software) used to perform (e.g., receive inputs, provide outputs) calls, chats, conferencing, or other aspects of human-to-human or human-to-machine communications.

The client computing device 770 is depicted as including a local area or short range area network interface 790, used to obtain the location verification data from the verifier device 750 (e.g., data included in the location verification data structure 704). The client computing device 770 is also depicted as including a wide area network interface 795, such as to access a wide area network (e.g., 4G/5G network for Internet connectivity). The network interfaces may provide software and/or hardware components to enable the client computing device 770 to associate, authenticate, and connect to the various networks, including network stacks (such as Transmission Control Protocol (TCP), Internet Protocol, one or more protocol layers specified by an 802.11 family of standards promulgated by the Institute for Electrical and Electronics Engineers (IEEE), and the like). As used herein, Wi-Fi capable access points and computing devices may communicate, authenticate, associate, connect and otherwise operate according to an IEEE 802.11 family of standards, such as 802.11n or 802.11ac. The computing device 770 may also include other network interfaces for communicating via other types of wired or wireless networks.

The verifier device 750 is depicted in FIG. 7 as including communications circuitry 760 and location identification functionality 765. The communications functionality 765 may facilitate respective connections with client devices (such as computing device 770) to communicate the location verification data (e.g., via the location verification data structure 704). In an example, at least a portion of the location verification data is provided from the communication service system 710 (e.g., via a location verification data structure). The verifier device 750 may also be aware of its location, which is confirmed with use of the communications service system 710.

The communication service system 710 is depicted in FIG. 7 as including communications circuitry 720, communications service functionality 725, and location verification functionality 730, operating in connection with a device location tracking database 740 and a verifier information database 735. One or both of these databases may enable the registry and tracking features discussed herein. The communications service functionality 725 may enable use of voice, video, or other telecommunication services, via the location-dependent resources discussed herein. Location verification functionality 730 may obtain and process information provided from the client computing device 770, such as a token (e.g., provided in a token data structure 706), which provides proof of the co-location of the client computing device 770 with the verifier device 750.

Finally, the administration and auditing system 740 is depicted in FIG. 7 as including location auditing functionality 745 to enable an administrator or a system process to verify locations and usage of the location-dependent resources of the communication service, such as to determine or verify an amount of time that a device operates at respective geographic locations. The information to verify or audit may be communicated via device and location data (e.g., via device/location information data structures 708). The location auditing functionality 745 may operate to produce other information for reports, billing, or services. Additional administrative control interfaces (not shown) may allow management and definition of rules and exceptions, consistent with administrator functionality.

Figure 8:
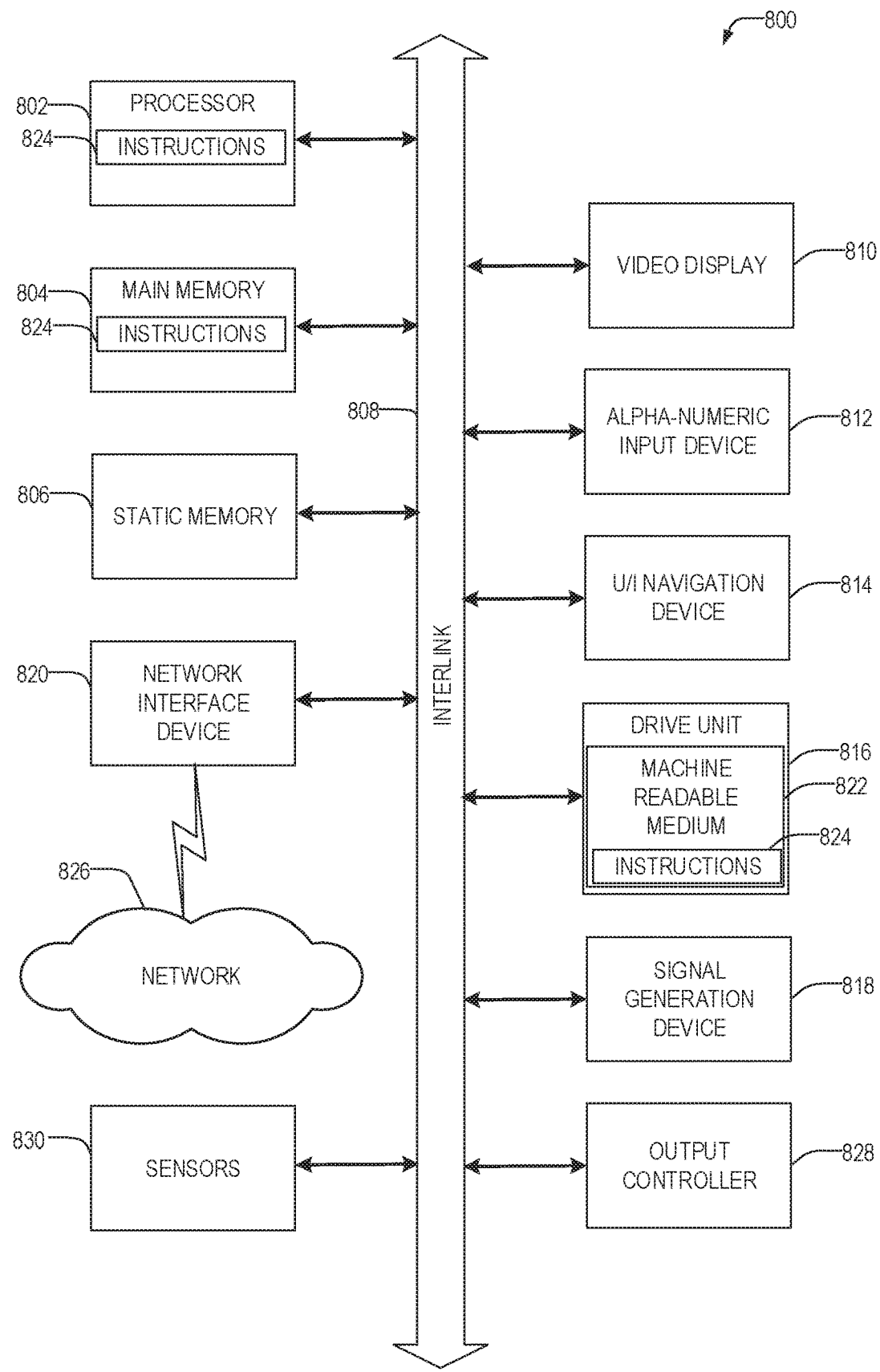
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a computing device such as a personal computer (PC), a tablet PC, a personal digital assistant (PDA), a mobile telephone, a cloud-based or networked server, a virtualized server, a smart phone, a web appliance, a network router, an access point, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 specifically may implement the devices and platforms 102, 104, 120, 130, 220, 230, 240, 250, 260 of FIGS. 1 and 2, the operations illustrated among the methods implemented in FIGS. 3-6, or any of the servers and devices 710, 740, 750, 770, as referenced in FIG. 7.

Examples, as described herein, may include, or may operate on, logic or a number of components, modules, or mechanisms (hereinafter "components"). Such components are tangible entities (e.g., hardware) capable of performing specified operations and may be configured or arranged in a certain manner. In an example, circuits or circuitry may be arranged (e.g., internally or with respect to external entities such as other circuits or circuitry) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium, such as a non-transitory machine-readable storage medium. In an example, the software, when executed by the underlying hardware of the component, causes the hardware to perform the specified operations.

Accordingly, such a component encompasses a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 830, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, a machine-readable medium may include a single medium or multiple media (e.g., a centralized or distributed database, and/or associated caches and servers) configured to store the one or more instructions 824. Thus, the term machine readable medium may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions.

Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media (e.g., excluding a transitory propagating signal).

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks, such as networks implementing the Institute of Electrical and Electronics Engineers (IEEE) 802.11 family of standards known as Wi-Fi®, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a communications device adapted for performing location verification, the device comprising: at least one hardware processor; and at least one memory device, including instructions, which when executed, cause the hardware processor to perform location verification operations comprising: receiving, at a geographic location, location verification data from a verification data source, such that the location verification data is unique to the geographic location; creating a token, the token including the location verification data and time data, such that the time data indicates use or location of the communications device at the geographic location at an indicated time; transmitting the token from the communications device to a communications service, in a scenario where the communications service is configured to register use of the communications device at the geographic location at the indicated time; and accessing a resource in the communications service, based on the registered use of the communications device at the geographic location.

In Example 2, the subject matter of Example 1 optionally includes features such that the location verification data provides an encrypted version of a random code, and such that the random code is verified by the communications service for use of the resource in the communications service at the geographic location.

In Example 3, the subject matter of any one or more of Examples 1-2 optionally includes features such that the token further includes an identifier of the communications device, and such that the communications service is configured to establish a communication session for the communications device, using the resource, in response to verification of the token.

In Example 4, the subject matter of Example 3 optionally includes features such that the communications service is configured to enable use of a geographic-based communication feature of the communications service, based on verification of the token.

In Example 5, the subject matter of any one or more of Examples 3-4 optionally include features such that the location verification data provided by the verification data source is synchronized with the communications service.

In Example 6, the subject matter of any one or more of Examples 1-5 optionally includes features such that the location verification data is received from the verification data source via a first wireless radio protocol, such that the token is transmitted to the communications service via a second wireless radio protocol.

In Example 7, the subject matter of Example 6 optionally includes features such that the first wireless radio protocol is: a Bluetooth Low Energy (BLE) protocol or a Bluetooth standard protocol compliant with a Bluetooth Standards Interest Group standards family, or a Wi-Fi protocol compliant with a standard from an IEEE 802.11 standards family.

In Example 8, the subject matter of any one or more of Examples 1-7 optionally includes features such that the location verification operations are repeated at a regular interval, or are triggered in response to a request to perform a communication using the resource.

In Example 9, the subject matter of any one or more of Examples 1-8 optionally includes features such that the transmitting of the token from the communications device to the communications service is provided by use of the token in a uniform resource locator (URL) accessed by the communications device.

In Example 10, the subject matter of any one or more of Examples 1-9 optionally includes features such that the geographic location further specifies a location within range of the verification data source in: a building, a floor of a building, an area of a city, or a group of locations.

Example 11 is a method for accessing a location-unique verification service, the method comprising operations performed by a computing device, using one or more hardware processors, the operations comprising: receiving location verification data from a verification data source, such that the location verification data is received at a geographic location, and the location verification data is unique to the geographic location; creating a token, the token including the location verification data and time data, such that the time data indicates use or location of the computing device at the geographic location at an indicated time; transmitting the token from the computing device to a communications service, such that the communications service is configured to register use of the computing device at the geographic location at the indicated time; and accessing a resource in the communications service, based on the registered use of the computing device at the geographic location.

In Example 12, the subject matter of Example 11 optionally includes features such that the location verification data provides an encrypted version of a random code, and the random code is verified by the communications service for use of the resource in the communications service at the geographic location.

In Example 13, the subject matter of any one or more of Examples 11-12 optionally includes features such that the token further includes an identifier of the computing device, and the communications service is configured to establish a communication session for the computing device, using the resource, in response to verification of the token.

In Example 14, the subject matter of any one or more of Examples 11-13 optionally includes the features such that location verification data being received from the verification data source via a first wireless radio protocol, and the token is transmitted to the communications service via a second wireless radio protocol, in a scenario where the first wireless radio protocol is: a Bluetooth Low Energy (BLE) protocol or a Bluetooth standard protocol compliant with a Bluetooth Standards Interest Group standards family, or a Wi-Fi protocol compliant with a standard from an IEEE 802.11 standards family.

In Example 15, the subject matter of any one or more of Examples 11-14 optionally includes the operations being repeated at a regular interval or are triggered in response to a request to perform a communication using the resource, such that the geographic location further specifies a location within range of the verification data source in: a building, a floor of a building, an area of a city, or a group of locations.

Example 16 is a computing device apparatus adapted for accessing a location-unique verification service, comprising: means for receiving, at a geographic location, location verification data from a verification data source, such that the location verification data is unique to the geographic location; means for creating a token, the token including the location verification data and time data, such that the time data indicates use or location of the computing device apparatus at the geographic location at an indicated time; means for transmitting the token to a communications service, to provide information to enable the communications service to register use of the computing device apparatus at the geographic location at the indicated time; and means for accessing a resource in the communications service, based on the registered use of the computing device apparatus at the geographic location.

In Example 17, the subject matter of Example 16 optionally includes the location verification data providing an encrypted version of a random code, such that the random code is verified by the communications service for use of the resource in the communications service at the geographic location.

In Example 18, the subject matter of any one or more of Examples 16-17 optionally include the token further including an identifier of the computing device apparatus, such that the communications service is configured to establish a communication session for the computing device apparatus, using the resource, in response to verification of the token.

In Example 19, the subject matter of any one or more of Examples 16-18 optionally includes means for receiving the location verification data from the verification data source via a first wireless radio protocol; and means for transmitting the token to the communications service via a second wireless radio protocol.

In Example 20, the subject matter of any one or more of Examples 16-19 optionally includes the geographic location further specifying a location within range of the verification data source in: a building, a floor of a building, an area of a city, or a group of locations.

What is claimed is:

1. A communications device adapted for performing location verification, the device comprising:
   at least one hardware processor; and
   at least one memory device, including instructions, which when executed, cause the hardware processor to perform location verification operations comprising:
   receiving, from a verification data source device located at a static geographic location, location verification data wirelessly broadcast from the verification data source device, the location verification data receivable within a transmission distance from the static geographic location, wherein the location verification data is unique to the static geographic location, the location verification data including a random code specific to a particular time period, the random code regenerated every time period by a random number generator of the verification data source device;
   creating a token, the token including the location verification data and time data, wherein the time data indicates the communications device is located at the geographic location at an indicated time;
   transmitting the token from the communications device to a computing device of a communications service, wherein the computing device of the communications service is configured to verify that the random code is a correct code for the particular time period using a random number generator on the computing device of the communication service that is synchronized to the random number generator of the verification data source device and in response, register use of the communications device at the geographic location at the indicated time; and
   accessing a resource in the communications service, based on the registered use of the communications device at the geographic location, the resource related to an audio or video communication between the communications device and a second communications device, the computing device of the communication service, the communications device, and the second communications device being different computing devices.

2. The device of claim 1, wherein the token further includes an identifier of the communications device, and wherein the communications service is configured to establish a communication session for the communications device, using the resource, in response to verification of the token.

3. The device of claim 2, wherein the communications service is configured to enable use of a geographic-based communication feature of the communications service, based on verification of the token.

4. The device of claim 1, wherein the location verification data is received from the verification data source device via a first wireless radio protocol, and wherein the token is transmitted to the communications service via a second wireless radio protocol.

5. The device of claim 4, wherein the first wireless radio protocol is: a Bluetooth Low Energy (BLE) protocol or a Bluetooth standard protocol compliant with a Bluetooth Standards Interest Group standards family, or a Wi-Fi protocol compliant with a standard from an IEEE 802.11 standards family.

6. The device of claim 1, wherein the location verification operations are repeated at a regular interval or are triggered in response to a request to perform a communication using the resource.

7. The device of claim 1, wherein the transmitting of the token from the communications device to the communications service is provided by use of the token in a uniform resource locator (URL) accessed by the communications device.

8. The device of claim 1, wherein the geographic location further specifies a location within range of the verification data source device in: a building, a floor of a building, an area of a city, or a group of locations.

9. A method for accessing a location-unique verification service, the method comprising operations performed by a communication device, using one or more hardware processors, the operations comprising:

receiving, from a verification data source device located at a static geographic location, location verification data wirelessly broadcast from the verification data source device, the location verification data receivable within a transmission distance from the static geographic location, wherein the location verification data is unique to the static geographic location, the location verification data including a random code specific to a particular time period, the random code regenerated every time period by a random number generator of the verification data source device;

creating a token, the token including the location verification data and time data, wherein the time data indicates the communications device is located at the geographic location at an indicated time;

transmitting the token from the communications device to a computing device of a communications service, wherein the computing device of the communications service is configured to verify that the random code is a correct code for the particular time period using a random number generator on the computing device of the communication service that is synchronized to the random number generator of the verification data source device and in response, register use of the communications device at the geographic location at the indicated time; and accessing a resource in the communications service, based on the registered use of the communications device at the geographic location, the resource related to an audio or video communication between the communications device and a second communications device, the computing device of the communication service, the communications device, and the second communications device being different computing devices.

10. The method of claim 9, wherein the token further includes an identifier of the communication device, and wherein the communications service is configured to establish a communication session for the communication device, using the resource, in response to verification of the token.

11. The method of claim 9, wherein the location verification data is received from the verification data source device via a first wireless radio protocol, and wherein the token is transmitted to the communications service via a second wireless radio protocol, wherein the first wireless radio protocol is: a Bluetooth Low Energy (BLE) protocol or a Bluetooth standard protocol compliant with a Bluetooth Standards Interest Group standards family, or a Wi-Fi protocol compliant with a standard from an IEEE 802.11 standards family.

12. The method of claim 9, wherein the operations are repeated at a regular interval or are triggered in response to a request to perform a communication using the resource, and wherein the geographic location further specifies a location within range of the verification data source device in: a building, a floor of a building, an area of a city, or a group of locations.

13. A communication device apparatus adapted for accessing a location-unique verification service, comprising:

means for receiving, receiving, from a verification data source device located at a static geographic location, location verification data wirelessly broadcast from the verification data source device, the location verification data receivable within a transmission distance from the static geographic location, wherein the location verification data is unique to the static geographic location, the location verification data including a random code specific to a particular time period, the random code regenerated every time period by a random number generator of the verification data source device;

means for creating a token, the token including the location verification data and time data, wherein the time data indicates the communication device apparatus is located at the geographic location at an indicated time;

means for transmitting the token from the communications device to a computing device of a communications service, wherein the computing device of the communications service is configured to verify that the random code is a correct code for the particular time period using a random number generator on the computing device of the communication service that is synchronized to the random number generator of the verification data source device and in response, register use of the communications device at the geographic location at the indicated time; and means for accessing a resource in the communications service, based on the registered use of the communications device at the geographic location, the resource related to an audio or video communication between the communications device and a second communications device, the computing device of the communication service, the communications device, and the second communications device being different computing devices.

14. The apparatus of claim 13, wherein the token further includes an identifier of the communication device apparatus, and wherein the communications service is configured to establish a communication session for the communication device apparatus, using the resource, in response to verification of the token.

15. The apparatus of claim 13, further comprising:

means for receiving the location verification data from the verification data source device via a first wireless radio protocol; and means for transmitting the token to the communications service via a second wireless radio protocol.

16. The apparatus of claim 13, wherein the geographic location further specifies a location within range of the verification data source device in: a building, a floor of a building, an area of a city, or a group of locations.

* * * * *